United States Patent
Gaines et al.

(10) Patent No.: US 10,906,446 B2
(45) Date of Patent: Feb. 2, 2021

(54) CONVENIENCE ASSEMBLY

(71) Applicant: Ford Global Technologies, LLC, Dearborn, MI (US)

(72) Inventors: David William Gaines, Farmington, MI (US); Benjamin Kulhawik, Canton, MI (US); Diego Santillan gutierrez, Tizayuca (MX); Raul Javier Elias, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 16/373,735

(22) Filed: Apr. 3, 2019

(65) Prior Publication Data

US 2020/0317105 A1 Oct. 8, 2020

(51) Int. Cl.
*B60N 3/00* (2006.01)
(52) U.S. Cl.
CPC ............ *B60N 3/002* (2013.01); *B60N 3/004* (2013.01)
(58) Field of Classification Search
CPC ......... B60N 3/002; B60N 3/004; B60N 3/001
USPC ........ 297/169, 160, 161, 163, 164, 165, 168
See application file for complete search history.

(56) References Cited

U.S. PATENT DOCUMENTS

| | | |
|---|---|---|
| 2,797,739 A | 7/1957 | Orsini |
| 4,809,897 A | 3/1989 | Wright, Jr. |
| 5,046,433 A | 9/1991 | Kramer et al. |
| 5,092,507 A | 3/1992 | Szablak et al. |
| 5,853,220 A * | 12/1998 | Gulich ............ B60R 11/0241 297/188.16 |
| 6,015,198 A | 1/2000 | Stair |
| 6,032,587 A | 3/2000 | Salenbauch et al. |
| 6,220,660 B1 | 4/2001 | Bedro et al. |
| 6,347,590 B1 | 2/2002 | D'Annunzio et al. |
| 6,547,323 B1 | 4/2003 | Aitken et al. |
| 6,761,388 B2 | 7/2004 | Lein et al. |
| 7,080,865 B2 | 7/2006 | Bergeron et al. |
| 7,114,755 B1 | 10/2006 | Sturt et al. |
| 7,278,681 B2 | 10/2007 | Lilov et al. |
| 7,293,507 B2 | 11/2007 | Depue et al. |
| 7,431,365 B2 | 10/2008 | Sturt et al. |
| 7,455,016 B2 | 11/2008 | Perin |
| 7,520,552 B2 | 4/2009 | Nakamura et al. |
| 7,641,252 B2 | 1/2010 | Stuart et al. |
| 7,748,762 B2 | 7/2010 | Mayne, Jr. |
| 7,793,597 B2 | 9/2010 | Bart et al. |
| 7,798,072 B2 | 9/2010 | Becker et al. |
| 8,002,323 B2 | 8/2011 | Jones et al. |
| 8,109,565 B2 | 2/2012 | Waters et al. |
| 8,167,366 B2 | 5/2012 | Charpentier et al. |
| 8,397,963 B2 | 3/2013 | Singh |

(Continued)

FOREIGN PATENT DOCUMENTS

DE 19901072 C1 3/2000

*Primary Examiner* — Mark R Wendell
(74) *Attorney, Agent, or Firm* — David Coppiellie; Price Heneveld LLP

(57) ABSTRACT

A convenience assembly includes a work surface coupled to a support structure by a mounting structure. A switch protrudes from the support structure toward an underside of the mounting structure. A switch-actuation assembly is positioned between the support structure and the work surface and is movable between raised and lowered positions relative to the switch to indicate a rotational position of the work surface relative to the support structure.

20 Claims, 11 Drawing Sheets

(56) References Cited

U.S. PATENT DOCUMENTS

| | | | |
|---|---|---|---|
| 8,421,407 B2 | 4/2013 | Johnson | |
| 9,168,850 B2 | 10/2015 | Meszaros et al. | |
| 9,896,010 B2 | 2/2018 | Berno | |
| 10,632,933 B2* | 4/2020 | Line | B60N 3/002 |
| 2005/0231337 A1 | 10/2005 | Tourneur et al. | |
| 2006/0208517 A1 | 9/2006 | Nakamura et al. | |
| 2007/0205622 A1 | 9/2007 | Whitens et al. | |
| 2009/0058152 A1* | 3/2009 | Orlo | B60N 2/206 297/163 |
| 2015/0284219 A1* | 10/2015 | McConnell | B60P 3/12 414/680 |
| 2017/0136842 A1* | 5/2017 | Anderson | B60G 17/0195 |
| 2018/0222592 A1* | 8/2018 | Tiwari | B29C 45/73 |

\* cited by examiner

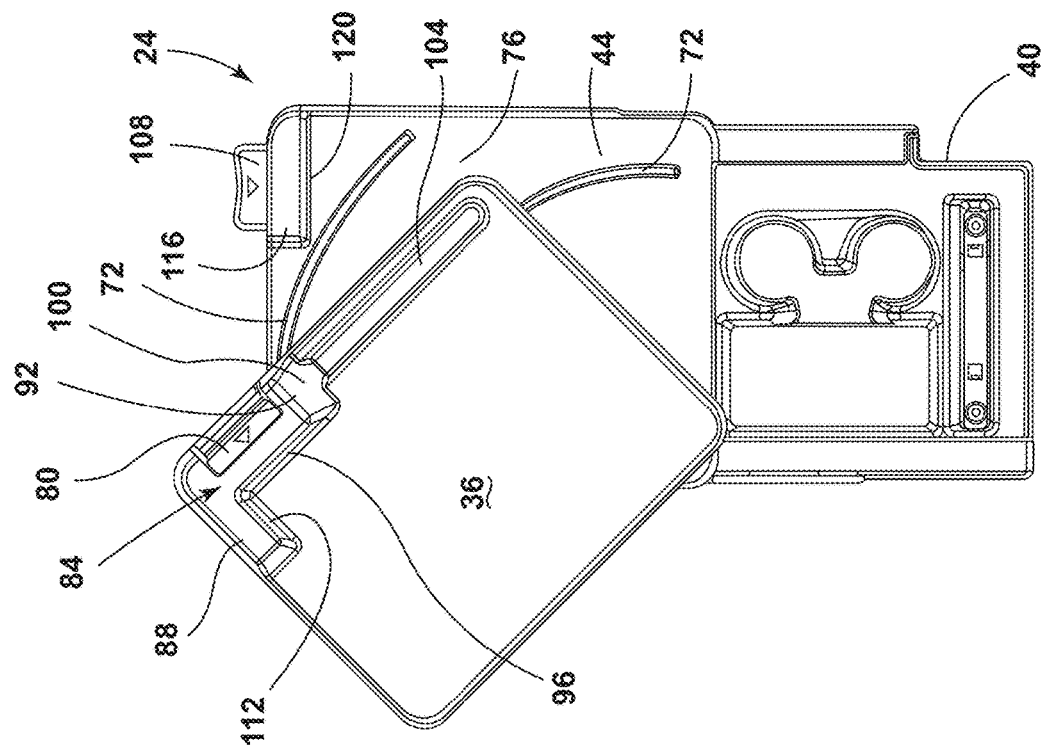
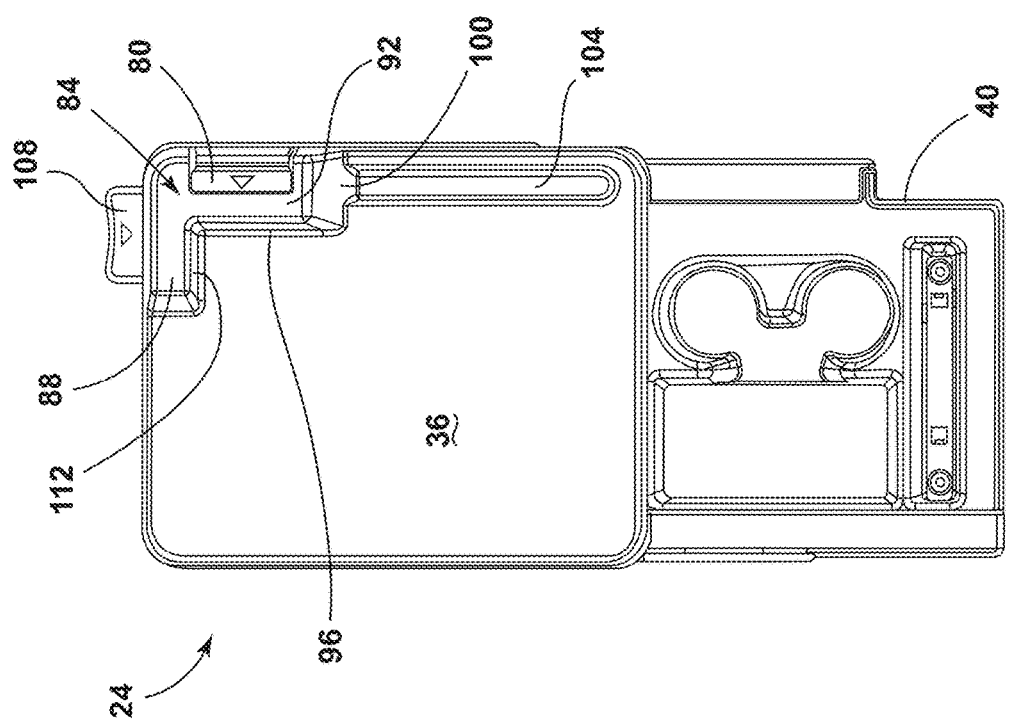

US 10,906,446 B2

CONVENIENCE ASSEMBLY

FIELD OF THE DISCLOSURE

The present disclosure generally relates to a convenience assembly. In some examples, the present disclosure relates to a convenience assembly for a vehicle.

BACKGROUND OF THE INVENTION

Consumers are constantly looking for ways to improve their comfort and efficiency. One area where consumers look for such improvements is in vehicles, particularly those used for commuting purposes and those used by tradesmen. Accordingly, additional solutions are needed to meet the growing needs and desires of today's consumers.

SUMMARY OF THE INVENTION

According to a first aspect of the present disclosure, a convenience assembly includes a work surface coupled to a support structure by a mounting structure. A switch protrudes from the support structure toward an underside of the mounting structure. A switch-actuation assembly is positioned between the support structure and the work surface and is movable between raised and lowered positions relative to the switch to indicate a rotational position of the work surface relative to the support structure.

Embodiments of the first aspect of the present disclosure can include any one or a combination of the following features:
  the switch-actuation assembly includes a planar portion, one or more posts that extend from the planar portion, a biasing member on at least one of the one or more posts, and an engagement portion positioned upon the one or more posts;
  at least a portion of the switch-actuation assembly passes through the mounting structure;
  the engagement portion includes one or more protrusions that extend from a body of the engagement portion;
  at least one of the one or more protrusions corresponds with one of the one or more posts;
  the work surface includes one or more ribs in an underside thereof;
  each of the one or more ribs engages with one of the one or more protrusions when the work surface is in a stowed position;
  each of the one or more ribs disengages with the associated one of the one or more protrusions when the work surface is not in the stowed position;
  the switch-actuation assembly is movable between the raised position and the lowered position by actuation through the mounting structure;
  the mounting structure is movable along a horizontal plane relative to the support structure;
  the work surface is capable of rotational motion relative to the mounting structure regardless of a lateral position of the mounting structure relative to the support structure;
  the work surface is capable of rotational motion relative to the mounting structure;
  the convenience assembly is installed in a vehicle;
  the support structure is a vehicle seating assembly; and
  the support structure is a vehicle console.

According to a second aspect of the present disclosure, a convenience assembly includes a work surface coupled to a support structure by a mounting structure. A switch protrudes from the support structure toward an underside of the mounting structure. A switch-actuation assembly is positioned between the support structure and the work surface. The switch-actuation assembly is movable between raised and lowered positions relative to the switch to indicate a rotational position of the work surface relative to the support structure. The switch-actuation assembly is movable between the raised position and the lowered position by actuation through the mounting structure.

Embodiments of the second aspect of the present disclosure can include any one or a combination of the following features:
  the switch-actuation assembly includes a planar portion, one or more posts that extend from the planar portion, a biasing member on at least one of the one or more posts, and an engagement portion positioned upon the one or more posts.

According to a third aspect of the present disclosure, a convenience assembly includes a work surface coupled to a support structure by a mounting structure. A switch protrudes from the support structure toward an underside of the mounting structure. A switch-actuation assembly is positioned between the support structure and the work surface. The switch-actuation assembly is movable between raised and lowered positions relative to the switch to indicate a rotational position of the work surface relative to the support structure. The switch-actuation assembly includes a planar portion, one or more posts that extend from the planar portion, a biasing member on at least one of the one or more posts, and an engagement portion positioned upon the one or more posts.

Embodiments of the third aspect of the present disclosure can include any one or a combination of the following features:
  the mounting structure is movable along a horizontal plane relative to the support structure; and
  the work surface is capable of rotational motion relative to the mounting structure regardless of a lateral position of the mounting structure relative to the support structure.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 3 is a top view of the convenience assembly, illustrating a work surface in a stowed position;

FIG. 4 is a top view of the convenience assembly, illustrating the work surface in a deployed position;

DETAILED DESCRIPTION OF THE PREFERRED EMBODIMENTS

Figure 1:
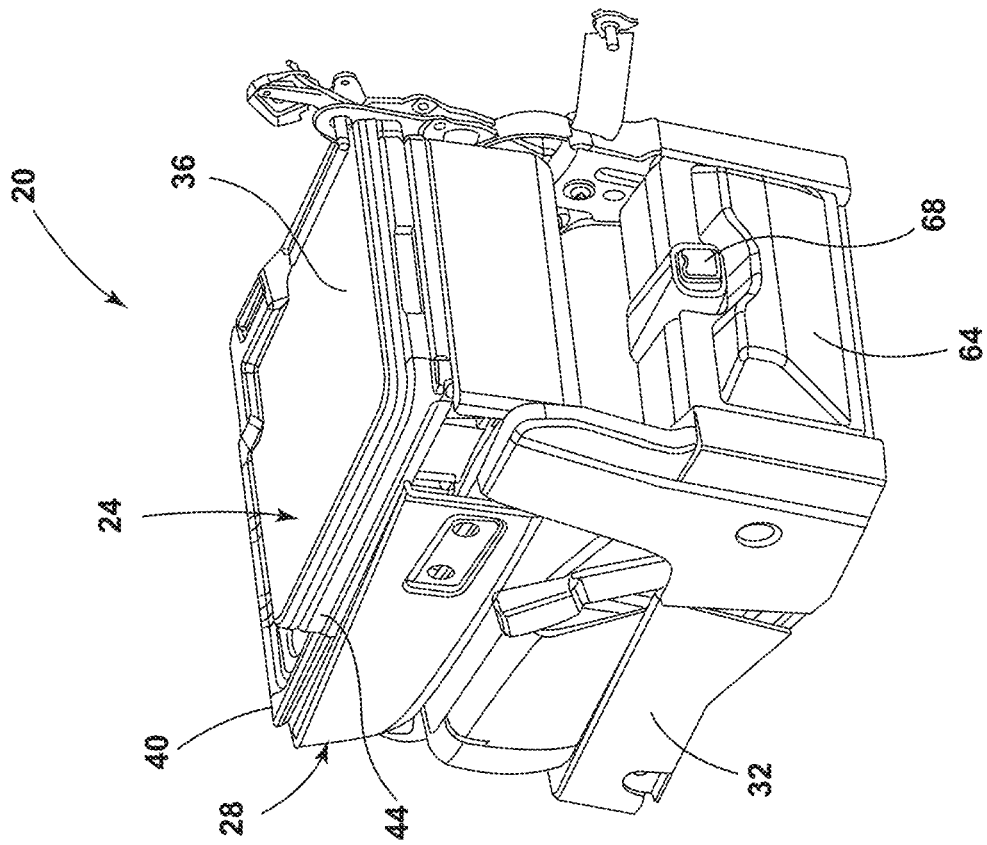
FIG. 1 is a rear perspective view of a seating assembly, illustrating a convenience assembly.
Figure 2:
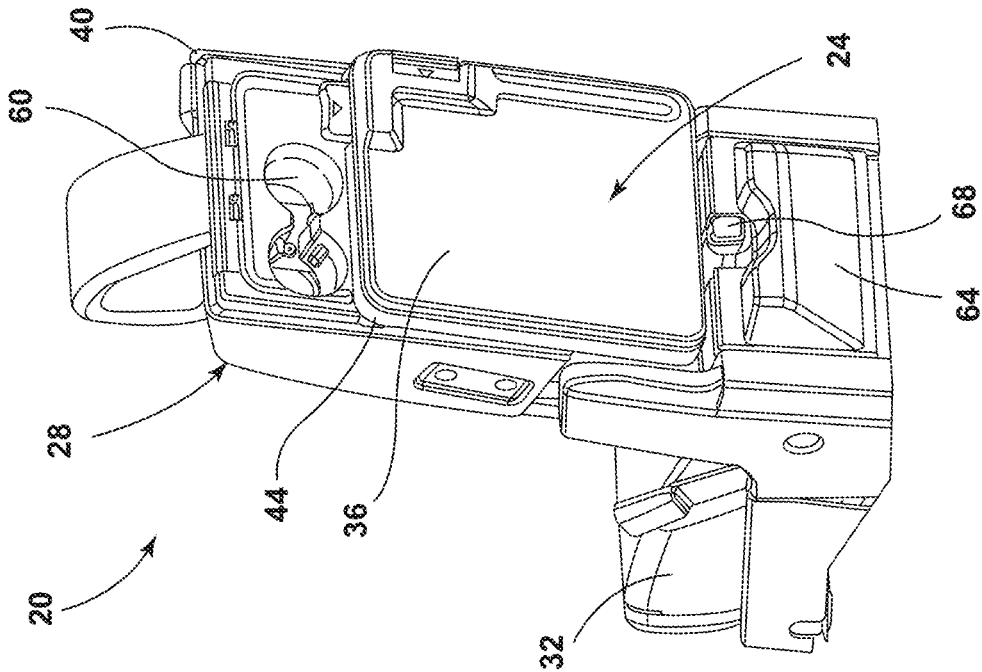
FIG. 2 is a rear perspective view of the seating assembly in a forward-dumped position, illustrating the convenience assembly.

For purposes of description herein, the terms "upper," "lower," "right," "left," "rear," "front," "vertical," "horizontal," and derivatives thereof shall relate to the concepts as oriented in FIG. 2 or 3. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a convenience assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 19:
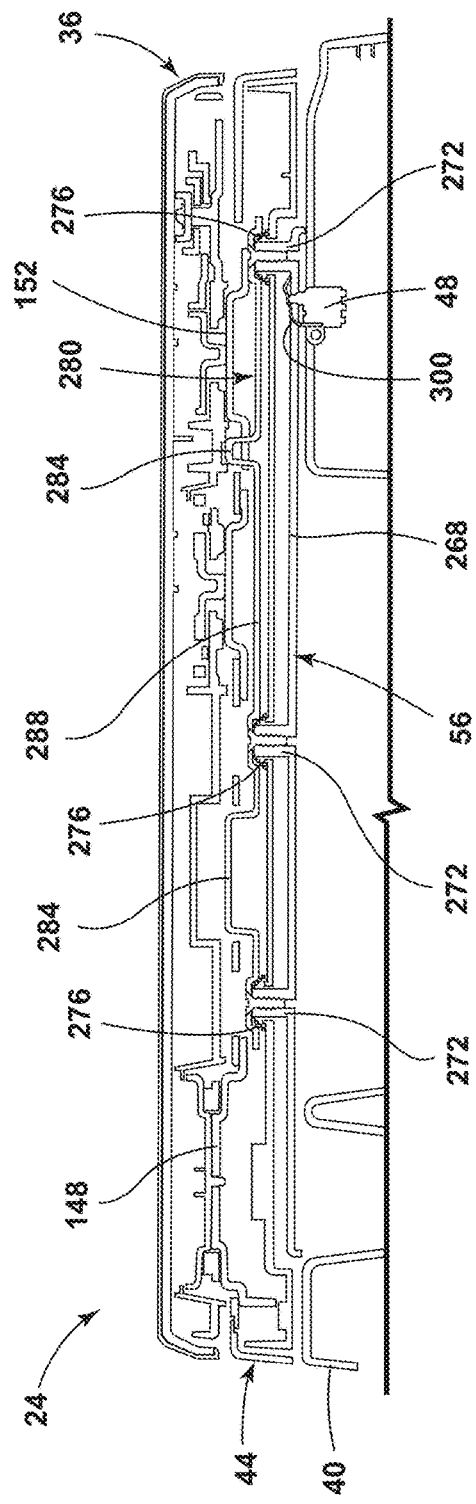
FIG. 19 is a cross-sectional view of the convenience assembly, taken along line IXX-IXX of FIG. 8, illustrating the switch-actuation assembly in a lowered position.
Figure 20:
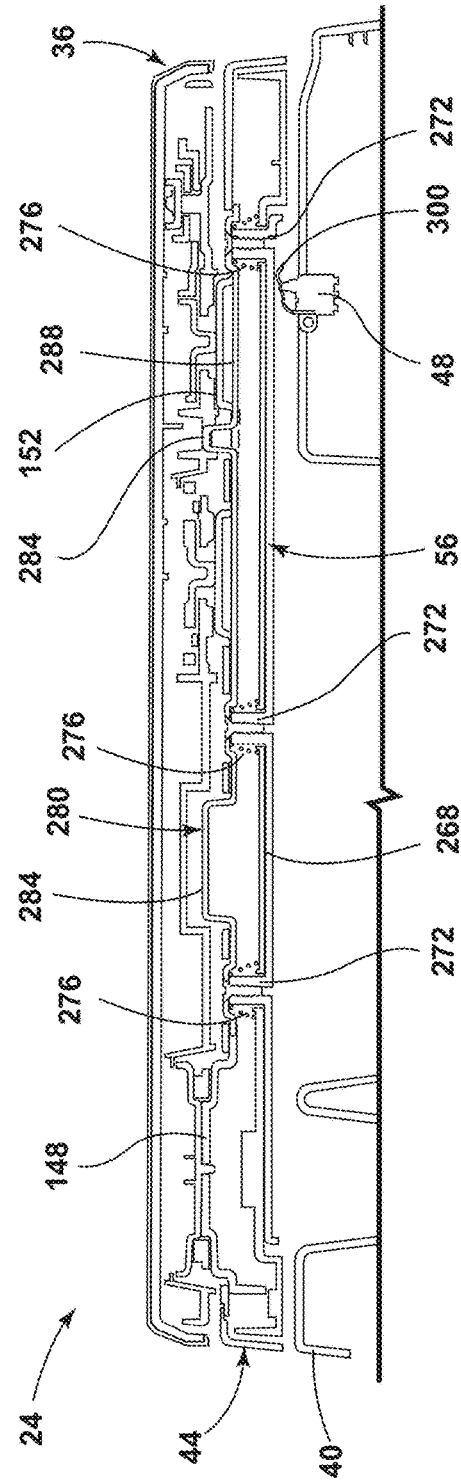
FIG. 20 is a cross-sectional view of the convenience assembly, taken along line IXX-IXX of FIG. 8, illustrating the switch-actuation assembly in a raised position.

Referring to FIGS. 1-20, reference numeral 20 generally designates a seating assembly. In some examples, the seating assembly 20 may support a convenience assembly 24 on a portion thereof. For example, the convenience assembly 24 can be supported on a rearward portion of a seatback 28 of the seating assembly 20. However, the convenience assembly 24 may be alternatively positioned within a vehicle, such as on a center console or a floor console. The vehicle may be a motor vehicle, such as a land vehicle, an air vehicle, a watercraft, or the like. The seatback 28 can be pivotably coupled to a seat base 32 of the seating assembly 20. The convenience assembly 24 includes a work surface 36 coupled to a support structure 40 by a mounting structure 44. A switch 48 can protrude from the support structure 40 toward an underside 52 of the mounting structure 44. In various examples, the switch 48 may extend through the mounting structure 44. A switch-actuation assembly 56 is positioned between the support structure 40 and the work surface 36 and is movable between raised (FIG. 20) and lowered (FIG. 19) positions relative to the switch 48 to indicate a rotational position of the work surface 36 relative to the support structure 40. In examples where the convenience assembly 24 is installed in a vehicle, the seating assembly 20 may be referred to as a vehicle seating assembly. Accordingly, the support structure 40 may be a vehicle seating assembly. Alternatively, the support structure 40 may be a vehicle console (e.g., center console or floor console).

Referring again to FIGS. 1 and 2, the convenience assembly 24 is shown on a rearward surface of the seatback 28 of the seating assembly 20. In the depicted example, the support structure 40 can be the rearward surface of the seatback 28. The rearward surface of the seatback 28 can include storage compartments, such as beverage holders 60, small item storage compartments, media device storage compartments, large item storage compartments, and so on. The seat base 32 may also be equipped with storage compartments. For example, the seat base 32 in the depicted example includes a rear-access storage compartment 64. The rear-access storage compartment 64 may be opened by actuation of a release button, by way of a push-push mechanism, applying a force to the rear-access storage compartment 64 that induces movement to an open position, and the like. A power outlet 68 may be provided with a cover and be positioned above the rear-access storage compartment 64. For example, the power outlet 68 may be a twelve volt (12V) outlet. In various examples, the rear-access storage compartment 64 may include one or more beverage holders 60, a small item storage compartment, mobile device storage compartment(s), and the like.

Referring now to FIGS. 3-4, the work surface 36 is movable between a stowed position, such as a rotationally stowed position (FIG. 3), and a deployed position (FIG. 4). The deployed position can be a fully-deployed position, such as that shown in FIG. 4, or a partially-deployed position. As the work surface 36 is transitioned between the stowed position and the deployed position, a portion of the work surface 36 can engage with one or more guide channels 72 that are defined by an upper surface 76 of the mounting structure 44. For example, the work surface 36 can be provided with one or more tabs or projections that extend from an underside of the work surface 36 to engage with the one or more guide channels 72. Accordingly, each of the guide channels 72 can receive one or more of the tabs or projections of the work surface 36. The rotational displacement between the stowed position and the fully-deployed position of the work surface 36 can be greater than fifteen degrees (15°), greater than thirty degrees (30°), greater than forty-five degrees (45°), greater than sixty degrees (60°), greater than seventy-five degrees (75°), about ninety degrees (90°), less than about ninety degrees (90°), and/or combinations or ranges thereof. The work surface 36 can be retained in the stowed position, the fully-deployed position, and intermediate positions therebetween that define partially-deployed positions. Actuation of the work surface 36 between the stowed and fully-deployed positions can be initiated by actuation of a work surface button 80. Actuation of the work surface button 80 can manipulate a locking assembly within the work surface 36, within the mounting structure 44, and/or within the support structure 40 between engaged and disengaged positions. Upon actuation of the work surface button 80, the locking assembly can be placed in the disengaged, or unlocked, position. After actuating the work surface button 80, a user can apply a lateral force to the work surface 36, while maintaining pressure on the work surface button 80, such that the work surface 36 is induced to move relative to the mounting structure 44. In some examples, upon release of the work surface button 80, once the user has placed the work surface 36 in a desired position, the locking assembly may reassume or revert to the engaged, or locked, position such that the work surface 36 is retained in position relative to the mounting structure 44. Alternatively, the locking assembly may only be placed in the engaged, or locked, position when the work surface 36 is in the stowed position. Accordingly, in such examples, upon release of the work surface button 80, the locking assembly may assume an intermediate position between the engaged and disengaged positions or may remain in the disengaged position until the work surface 36 is returned to the stowed position. Once in the stowed position, the locking assembly can again assume the engaged, or locked, position and the work surface 36 can therefore be retained relative to the mounting structure 44.

Referring again to FIGS. 3-4, the locking assembly may be at least partially housed within a raised portion 84 of the work surface 36. The raised portion 84 can include a lateral arm 88 and a longitudinal arm 92. The work surface button 80 can be positioned in the longitudinal arm 92. The raised portion 84, in addition to optionally housing or concealing a locking assembly, can provide a bearing surface for the palm of a user's hand to engage with when actuating the work surface button 80. For example, a user may rest their palm on a first side 96 or a second side 100 of the longitudinal arm 92 and utilize the raised portion 84 as a bearing surface for their palm and/or thumb as they exert the force necessary to depress the work surface button 80. The first and second sides 96, 100 of the longitudinal arm 92 can be provided with sloped and/or radiused surfaces such that the user is not presented with sharp corners or abrupt directional changes that can result in discomfort during use. In various examples, a tray or trough 104 may be defined by the work surface 36. The trough 104 can be utilized to retain writing utensils and other small items that a user desires to have quick access to when utilizing the work surface 36. The trough 104 can extend from the second side 100 of the longitudinal arm 92 of the raised portion 84 toward a rearward edge of the work surface 36.

Referring further to FIGS. 3-4, the mounting structure 44 can be provided with a mounting structure button 108. The mounting structure button 108 can be positioned in the lateral arm 88. As with the work surface button 80, the raised portion 84, in addition to optionally housing or concealing a locking assembly, can provide a bearing surface for the palm and/or thumb of a user's hand to engage with when actuating the mounting structure button 108. For example, a user may rest their palm on a first side 112 of the lateral arm 88 and utilize the raised portion 84 as a bearing surface for their palm as they exert the force necessary to depress the mounting structure button 108. The first side 112 of the lateral arm 88 can be provided with sloped and/or radiused surfaces such that the user is not presented with sharp corners or abrupt directional changes that can result in discomfort during use. The mounting structure button 108 can be actuated by a user to adjust a longitudinal position of the mounting structure 44 relative to the support structure 40. For example, a user can depress the mounting structure button 108 and apply a force in a longitudinal direction (i.e., in an upward or downward direction as oriented in FIGS. 3 and 4) such that the mounting structure 44 slides along the support structure 40. Additionally or alternatively, the mounting structure 44 can be provided with a raised section 116 that is positioned proximate the mounting structure button 108. Accordingly, the raised section 116 can provide a bearing surface for the palm of a user's hand to engage with when actuating the mounting structure button 108 when the work surface 36 is rotated away from the stowed position. As with the raised portion 84 of the work surface 36, the user may rest their palm on a first side 120 of the raised section 116 and utilize the raised section 116 as a bearing surface for their palm as they exert the force necessary to depress the mounting structure button 108. As also with the raised portion 84, the raised section 116 can be provided with sloped and/or radiused surfaces such that the user is not presented with sharp corners or abrupt directional changes that can result in discomfort during use. When the work surface 36 is in the stowed position, the mounting structure button can remain accessible such that the mounting structure 44 is movable regardless of a rotational position of a rotational position of the work surface 36. Of course, if the work surface 36 impacts another adjacent component (e.g., an adjacent seating assembly), then the movable nature of the mounting structure 44 may be impeded when the work surface 36 is in a position other than the stowed position. However, the rotational position of the work surface 36 relative to the mounting structure 44, in and of itself, need not have a bearing on the operability of the mounting structure 44. In general, for examples where the work surface 36 is installed in a vehicle, it may be beneficial to constrain the movement of the work surface 36 and/or the mounting structure 44 to prevent the work surface 36 and/or the mounting structure 44 from contacting a steering wheel, an instrument panel, a dashboard, and/or other components, including occupants, during normal operation.

Referring to FIGS. 5-10, the convenience assembly 24 is shown according to various examples. The mounting structure 44 is movable relative to the support structure 40. In the depicted examples, the mounting structure 44 is movable longitudinally along the support structure 40. That is, the mounting structure 44 is movable along a length of the support structure 40. For example, the mounting structure 44 can be movable relative to the support structure 40 along a horizontal plane in fore and aft directions within a vehicle. In various examples, the mounting structure 44 can be movable along a range of motion that is at least 250 mm long, at least 270 mm long, at least 290 mm long, at least 310 mm long, at least 330 mm long, and/or combinations or ranges thereof. In some examples, the range of motion of the mounting structure 44 may be limited to forward motion relative to the support structure 40 or limited to rearward motion relative to the support structure 40. Regardless of the direction and extent of motion of the mounting structure 44 relative to the support structure 40, the work surface 36 is capable of rotation relative to the mounting structure 44 along an entirety of the range of motion of the mounting structure 44. Such a large degree of freedom for the mounting structure 44 and the work surface 36 can create a difficult wiring and packaging situation. However, the present disclosure provides a compact solution by way of the switch 48 and the switch-actuation assembly 56. The beverage holders 60 can be positioned within, or defined by, the support structure 40. The beverage holders 60 may be positioned at a rearward portion of the support structure 40, such as in FIGS. 5-7, when the support structure 40 is in a use position (e.g., a forward-dumped position for the seating assembly 20). Alternatively, the beverage holders 60 may be positioned at a forward portion of the support structure 40, such as in FIGS. 8-10, when the support structure 40 is in a use position (e.g., the forward-dumped position for the seating assembly 20). The use position of the support structure 40 may be continuously occupied by the support structure 40, such as when the support structure 40 is a floor console or a center console.

Referring again to FIGS. 5-10, the movable nature of the mounting structure 44 relative to the support structure 40 may be accomplished by a slidable coupling of the mounting structure 44 to the support structure 40. For example, the mounting structure 44 can be provided with slide channels that receive a portion of the support structure 40, such as an edge, a protrusion, or a lip 124 of the support structure 40. In one example, the slide channels may be generally C-shaped with an open end of the C-shape facing inward toward a centerline of the mounting structure 44. The portion of the support structure 40 that is received within the slide channels, such as the lip 124, can extend an entire length of the support structure 40 when the support structure 40 is in the use position. Alternatively, the portion of the support structure 40 that is received within the slide channels, such as the lip 124, can extend along a portion of the length of the support structure 40 when the support structure 40 is in the use position. In some examples, the portion of the support structure 40 that is received within the slide channels, such as the lip 124, may extend along the length of the support structure 40 to varying extents on different sides of the support structure 40. For example, the lip 124 can extend along an entire length, or a substantial portion of the length, of a first side 128 of the support structure 40 while extending along a second side 132 of the support structure 40 to a lesser extent than the first side 128. In such an arrangement, the slide channels of the mounting structure 44 need not be continuously engaged with the support structure 40 along an entirety of the length of the mounting structure 44 for the mounting structure 44 to be able to safely and effectively operate. In various examples, so long as the mounting structure 44 is at least partially engaged with the first side 128 and the second side 132 of the support structure 40 at a given position, the mounting structure 44 may be capable of safe and effective operation. It is contemplated that the engagement between the mounting structure 44 and the first and second sides 128, 132 of the support structure 40 can be longitudinally offset from one another. Said another way, the mounting structure 44 may engage with a rearward portion of the first side 128 of the support structure 40 and a forward portion of the second side 132 of the support structure 40 to retain and guide the mounting structure 44. In various examples, the mounting structure 44 can be adjusted along an entirety of the length of the support structure 40. In some examples, the mounting structure 44 can also be actuated beyond a forward edge 136 and/or a rearward edge 140 of the support structure 40 such that the mounting structure 44 is free of direct engagement with the support structure 40 along at least a portion of the length of the mounting structure 44.

Figure 7:
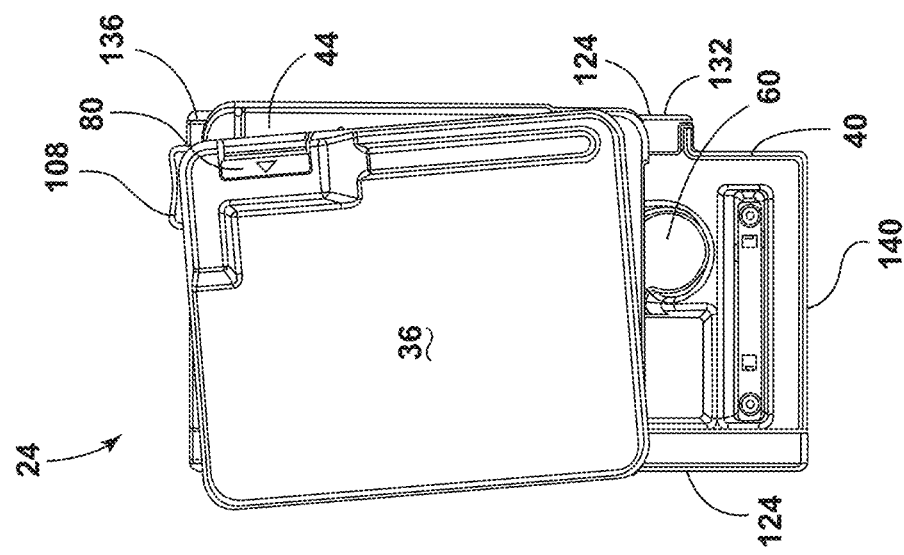
FIG. 7 is a top view of the convenience assembly, illustrating the work surface in the partially deployed position and in a rearward-actuated position along the convenience assembly, according to one example.
Figure 6:
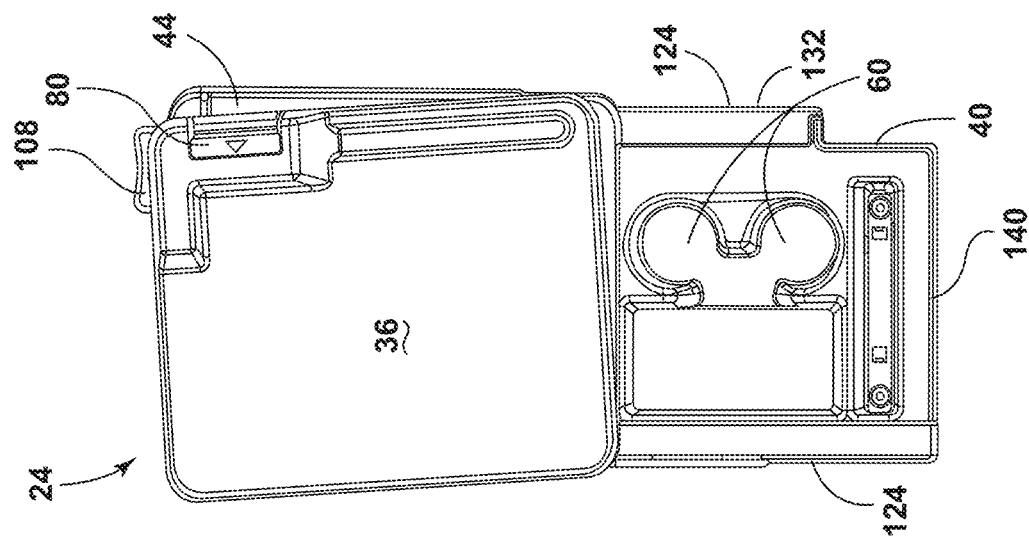
FIG. 6 is a top view of the convenience assembly, illustrating the work surface in a partially deployed position and in the forward-actuated position along the convenience assembly, according to one example.
Figure 9:
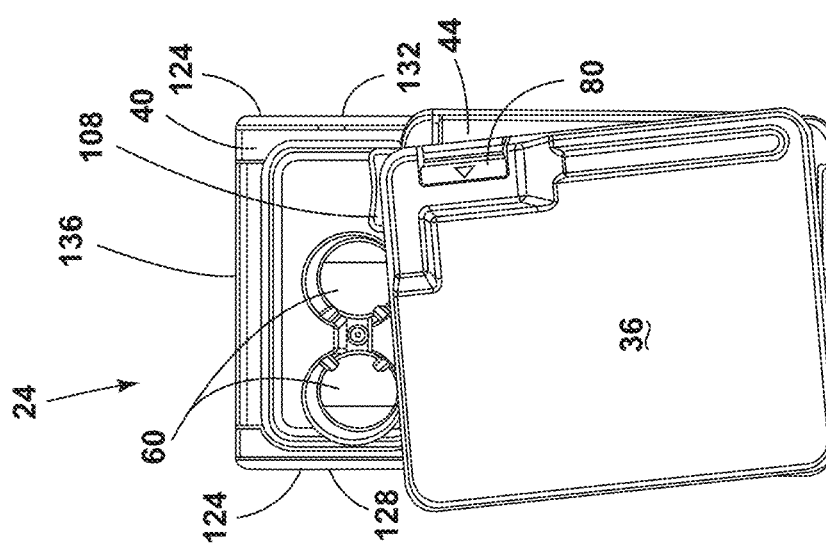
FIG. 9 is a top view of the convenience assembly, illustrating the work surface in the partially deployed position and in the rearward-actuated position along the convenience assembly, according to one example.

Referring further to FIGS. 5-10, the work surface 36 is shown in a variety of longitudinal and rotational positions. In the depicted examples, longitudinal movement and rotational movement relative to the support structure 40 are decoupled, or separate, from one another. The mounting structure 44 provides longitudinal adjustments relative to the support structure 40 and the work surface 36 provides rotational adjustments relative to both the support structure 40 and the mounting structure 44 in the depicted examples. The rotational positions that the work surface 36 can assume or be placed in are the stowed position (FIGS. 5 and 8), the fully-deployed position (FIG. 10), and partially-deployed positions (FIGS. 6, 7, and 9). As discussed above, the partially-deployed position may be any rotational position of the work surface 36 that is between the stowed position and the fully-deployed position. The work surface 36 may be placed in one of the partially-deployed positions by a user either intentionally or unintentionally. When the work surface 36 is intentionally placed in one of the partially-deployed positions, the user has likely placed the work surface 36 in such a position for utilization of the work surface 36 to perform a task. For example, the work surface 36 may be utilized as a mobile desk or vehicle desk, as a support for a mobile device or mobile computer, or the like. When the work surface 36 is placed in one of the partially-deployed positions unintentionally, the user may have released the work surface button 80 prior to the work surface 36 being in a rotational position where the work surface 36 can be locked in the stowed position or otherwise failed to properly stow the work surface 36. In examples where the support structure 40 is positioned within a vehicle, a controller may be provided with instructions that prevent the vehicle from being driven while the work surface 36 is in a position other than the stowed position. The instruction, programming, logic, or other form of communication or operation may reference the switch 48 (see FIG. 14). The switch 48 may be utilized to determine a rotational position of the work surface 36 or may be utilized as a binary input to determine whether the work surface 36 is in the stowed position. Said another way, the switch 48 can be utilized to answer the question, "is the work surface 36 in the stowed position?" and the controller can respond accordingly.

Referring now to FIGS. 11-14, the work surface 36 may be one component of a larger assembly, such as the convenience assembly 24. The work surface 36 may be an uppermost component of the convenience assembly 24 and include a top portion 144 that provides a substantially smooth and aesthetically pleasing surface for the user to work upon. The work surface 36 may be operably coupled to the mounting structure 44. The mounting structure 44 may include a first puck 148 and a second puck 152. A puck as used herein is defined as a feature of the convenience assembly 24 that is configured to aid in guiding the work surface 36 through a deployment path as the work surface 36 is transitioned between the stowed position and the fully-deployed position. Additionally, the puck, as used herein, may be configured to aid in retaining the work surface 36 in the various positions during a locked configuration. The first and/or the second puck 148, 152 may aid in guiding the deployment and stowing of the work surface 36. In some examples, the mounting structure button 108 of the mounting structure 44 may be provided as a pull tab 156 that serves as a gripping surface to actuate the mounting structure 44 in a forward and/or rearward direction and a pivot tab 160 that serves as a pivot point or rotational axis for the work surface 36. The support structure 40 can include a bin assembly 164. The bin assembly 164 may include one or more storage compartments 168 and/or one or more of the beverage holders 60. The bin assembly 164 may further include one or more slide tracks 172 that are positioned on one or more sides of the bin assembly 164 such that the slidable coupling of the mounting structure 44 to the support structure 40, by way of the bin assembly 164, may be guided along the slide tracks 172. The slide tracks 172 can serve the same or a similar purpose as the lip 124, which may additionally be included on the slide tracks 172. Said another way, the slide tracks 172 can include a vertical protrusion 176 and a horizontal protrusion 180, and the horizontal protrusion 180 may be similar to the lip 124. The slide tracks 172 or the lip 124 can be received within a slide channel 184. The slide channels 184 can include a vertical slot 188 that receives the vertical protrusion 176 and a horizontal slot 192 that receives the horizontal protrusion 180. In operation, the work surface 36 may remain in the stowed position while operably coupled to the mounting structure 44 as the mounting structure 44 is actuated along the slide tracks 172 to reveal the bin assembly 164. Said another way, the work surface 36 and the mounting structure 44 may be actuated independent of one another. The convenience assembly 24 may include a support housing 196, such as a substrate, as a lower portion of the convenience assembly 24. The support housing 196 may be utilized, in some examples, as an adapter for mounting the convenience assembly 24 to various carriers (e.g., the seatback 28).

Referring again to FIGS. 11-14, the work surface 36 may include a bottom portion 200. The bottom portion 200 may define a pivot aperture 204, a first puck track 208, and a second puck track 212. The bottom portion 200 may further include a plurality of standoffs 216 and a work surface button cutout 220. The top portion 144 and the bottom portion 200 of the work surface 36 may be operably coupled to one another by one or more fasteners. The bottom portion 200 may further define one or more fastener apertures 224 that are utilized for coupling the top portion 144 to the bottom portion 200. The bottom portion 200 may include a series of reinforcements, such as a hexagonal pattern 228 that protrudes upward from the surface of the bottom portion 200. The series of reinforcements may provide some rigidity to the bottom portion 200 that may aid in distributing or generally supporting a load applied to the work surface 36 (e.g., a laptop or resting arm of the occupant) and may aid in supporting the work surface 36 when the work surface 36 is not fully supported by the mounting structure 44 (e.g., when the work surface 36 is not in the rotationally stowed position).

Referring further to FIGS. 11-14, in various examples, the mounting structure 44 includes the guide channels 72 for providing guidance to the work surface 36 as the work surface 36 is actuated between the stowed position and the fully-deployed position. The guide channels 72 are defined by the mounting structure 44 and are provided as recesses within the mounting structure 44. The guide channels 72 can each receive one or more protrusions that extend from an underside of the work surface 36. The guide channels 72 and the first and second pucks 148, 152 can be utilized simultaneously for the guidance of the work surface 36 between the stowed and the deployed positions. Alternatively, the guide channels 72 and the first and second pucks 148, 152, and the associated first and second puck tracks 208, 212, may be utilized in a mutually exclusive manner. That is, the guide channels 72 may be utilized in some examples, while the first puck 148, the second puck 152, the first puck track 208, and the second puck track 212 are utilized in separate examples.

Referring still further to FIGS. 11-14, the mounting structure 44 can be provided with a lock assembly 232 coupled thereto. The lock assembly 232 can include a locking plate 236 that defines locking teeth 240 on at least one side of the locking plate 236. The locking plate 236 can be dynamically coupled to an actuator plate 244. That is, movement imparted to the actuator plate 244 may be transmitted to the locking plate 236 such that movement is induced in the locking plate 236. For example, the actuator plate 244 can be coupled to the mounting structure button 108 such that actuation of the mounting structure button 108 by the user imparts movement to the actuator plate 244, which in turn induces movement in the locking plate 236. The actuator plate 244 may be limited to movement in a single direction. For example, a retention plate 248 may retain the locking plate 236 and the actuator plate 244 to the mounting structure 44 while maintaining a limited degree of freedom for the locking plate 236 and the actuator plate 244 to each maintain the ability to move. In the depicted example, the retention plate 248 is positioned above the locking plate 236 and the actuator plate 244 with the actuator plate 244 positioned between the locking plate 236 and the retention plate 248. The retention plate 248 may be provided with protrusions or standoffs that pass through apertures in the actuator plate 244 and the locking plate 236 to engage with the mounting structure 44. These protrusions or standoffs on the retention plate 248 can define fastener apertures 252 that receive fasteners that pass therethrough to engage with the mounting structure 44 (e.g., threadably engage with the mounting structure 44). The protrusions or standoffs of the retention plate 248 can pass through linear apertures 256 that have a length that is greater than a width of the protrusions or standoffs such that the actuator plate 244 can move relative to the retention plate 248. The term linear apertures 256 is not intended to limit the present disclosure. Rather, the term linear aperture is intended to refer to an aperture that limits movement of the actuator plate 244 in a unidirectional manner (e.g., limited to up and down movement as oriented in FIG. 14).

Referring yet again to FIGS. 11-14, the actuator plate 244 can be provide with angular tabs 260 that extend into sloped apertures 264 in the locking plate 236. Linear motion of the actuator plate 244, which is initiated by actuation of the mounting structure button 108, causes linear motion of the angular tabs 260. Linear motion of the angular tabs 260, due to their engagement with the sloped apertures 264, induces movement of the locking plate 236 in a direction that is angularly offset from the direction of movement of the actuator plate 244. For example, the angular offset of the motion of the locking plate 236 may be generally orthogonal or perpendicular to the motion of the actuator plate 244 such that the locking plate 236 moves in a left and right direction as oriented in FIG. 14. Accordingly, the locking plate 236 may be operated between engaged and disengaged, or locked and unlocked, positions with at least one other component of the convenience assembly 24 (e.g., the work surface 36 or the support structure 40).

Referring to FIGS. 15-20, the convenience assembly 24 is provided with the switch 48 and the switch-actuation assembly 56. In some examples, the switch 48 may protrude from the support structure 40 toward an underside of the mounting structure 44. That is, the switch 48 may be mounted to the support structure 40 in such a manner that the switch 48 extends to a space between the support structure 40 and the mounting structure 44. The switch-actuation assembly 56 can be positioned between the support structure 40 and the work surface 36. In some examples, the switch-actuation assembly 56 may be somewhat or at least partially integrated into the mounting structure 44. Said another way, at least a portion of the switch-actuation assembly 56 can pass through the mounting structure 44 or a component of the mounting structure 44. For example, see FIG. 14 where the switch-actuation assembly 56 is positioned above the mounting structure 44 in some locations and passes below or through the first and second pucks 148, 152. The switch-actuation assembly 56 is movable between raised (FIG. 20) and lowered (FIG. 19) positions relative to the switch 48. Actuation of the switch 48 by the switch-actuation assembly 56 can be utilized to indicate a rotational position of the work surface 36 relative to the support structure 40.

Referring again to FIGS. 15-20, the switch-actuation assembly 56 can include a planar portion 268. One or more posts 272 may extend from the planar portion 268 of the switch-actuation assembly 56. In various examples, the switch-actuation assembly 56 can include a biasing member 276 that is provided on at least one of the one or more of the posts 272. The switch-actuation assembly 56 can further include an engagement portion 280 that is positioned upon at least one of the one or more posts 272. The engagement portion 280 of the switch-actuation assembly 56 can include one or more protrusions 284 that extend from a body 288 of the engagement portion 280. In various examples, at least one of the one or more protrusions 284 on the engagement portion 280 may correspond with one of the one or more posts 272. The work surface 36 can include one or more ribs 292 that extend from an underside 296 of the work surface 36. In some examples, each of the one or more ribs 292 can engage with one of the one or more protrusions 284 when the work surface 36 is in the stowed position. The ribs 292 can disengage with the associated one of the one or more protrusions 284 when the work surface 36 is not in the stowed position (e.g., in the fully-deployed position or one of the partially-deployed positions). For example, the ribs 292 may be positioned on the work surface 36 such that the ribs only engage with the protrusions 284 when the work surface 36 is in the stowed position. Accordingly, in such an example, the switch 48 may be operated as a binary switch where an open state of the switch 48 may indicate that the work surface 36 is not in the stowed position and a closed state of the switch 48 may indicate that the work surface 36 is in the stowed position. Alternatively, the ribs 292 may be provided with a gradual decrease in height or a step-wise decrease in height such that as the work surface 36 is rotated through a range of motion of the work surface, the switch 48 is exposed to varying degrees of force or pressure. In such an example, the varied force or pressure experienced by the switch 48 can be utilized (e.g., by a controller) to determine a non-binary rotational position of the work surface 36. In examples that utilize a step-wise decrease, the discrete or individual steps may be transitioned between with sloped sections such that the switch-actuation assembly 56 and the ribs 292 do not bind or catch on one another. The non-binary rotational position of the work surface 36 can provide a more accurate determination of the rotational position of the work surface 36. For example, the non-binary rotational position of the work surface 36 may be determined within five degrees (5°) of a true position, within ten degrees (10°) of a true position, within fifteen degrees (15°) of a true position, or the like. In various examples, the switch-actuation assembly 56 can be movable between the raised and the lowered position by actuation through the mounting structure 44 or actuation through a component of the mounting structure 44. The switch 48 may be provided with a resilient member 300 that extends over at least a portion of the switch 48. The resilient member 300 can bias the switch 48 to a raised or open position such that a weight of components positioned above the switch 48 are prevented from resulting in a false positive reading of the switch 48 that would indicate the work surface 36 was in the stowed position, when in fact the work surface 36 was not in the stowed position. The resilient member 300 may also increase a surface area of engagement between the switch 48 and the switch-actuation assembly 56 such that a likelihood that that switch-actuation assembly 56 contacts and properly interacts with the switch 48 is increased. The mounting structure 44 is movable along a horizontal plane relative to the support structure 40. Of course, if the support structure 40 is the seatback 28 of the seating assembly 20, then the plane that defines the movement of the mounting structure 44 may be angular displaced from horizontal. However, in such an example, the mounting structure 44 is movable along a plane that is generally or substantially parallel to the support structure 40. The work surface 36 is capable of rotational motion relative to the mounting structure 44. The rotational motion of the work surface 36 can be independent of a lateral position of the mounting structure 44 relative to the support structure 40. Said another way, the work surface 36 is capable of rotational motion relative to the mounting structure 44 regardless of the lateral position of the mounting structure 44 relative to the support structure 40.

Figure 5:
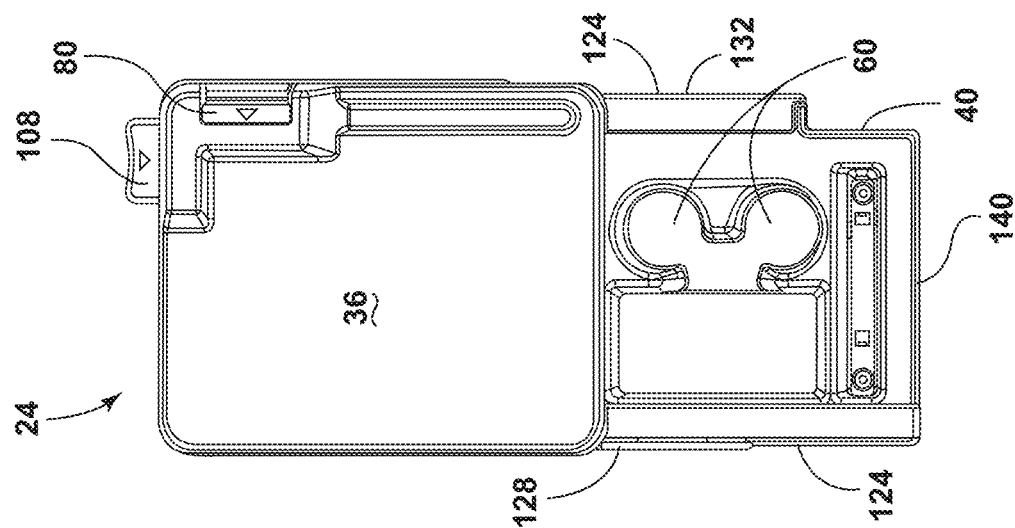
FIG. 5 is a top view of the convenience assembly, illustrating the work surface in the stowed position and in a forward-actuated position along the convenience assembly, according to one example.
Figure 10:
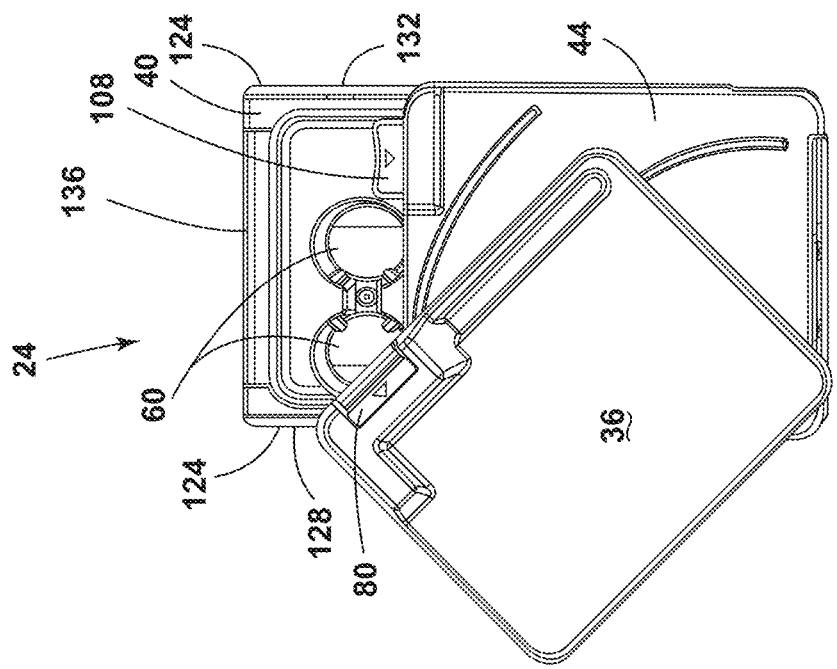
FIG. 10 is a top view of the convenience assembly, illustrating the work surface in a deployed position, according to one example.
Figure 8:
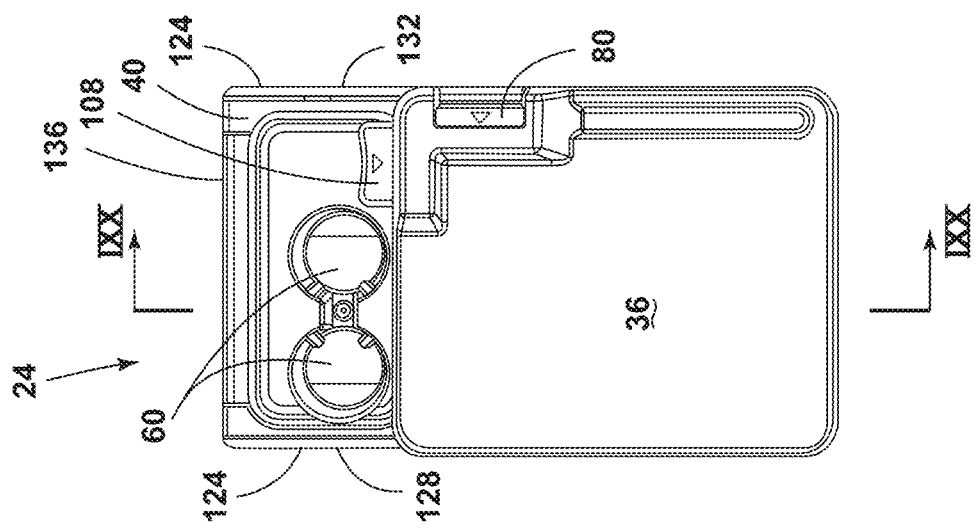
FIG. 8 is a top view of the convenience assembly, illustrating the work surface in the stowed position and in a rearward-actuated position along the convenience assembly, according to one example.
Figure 11:
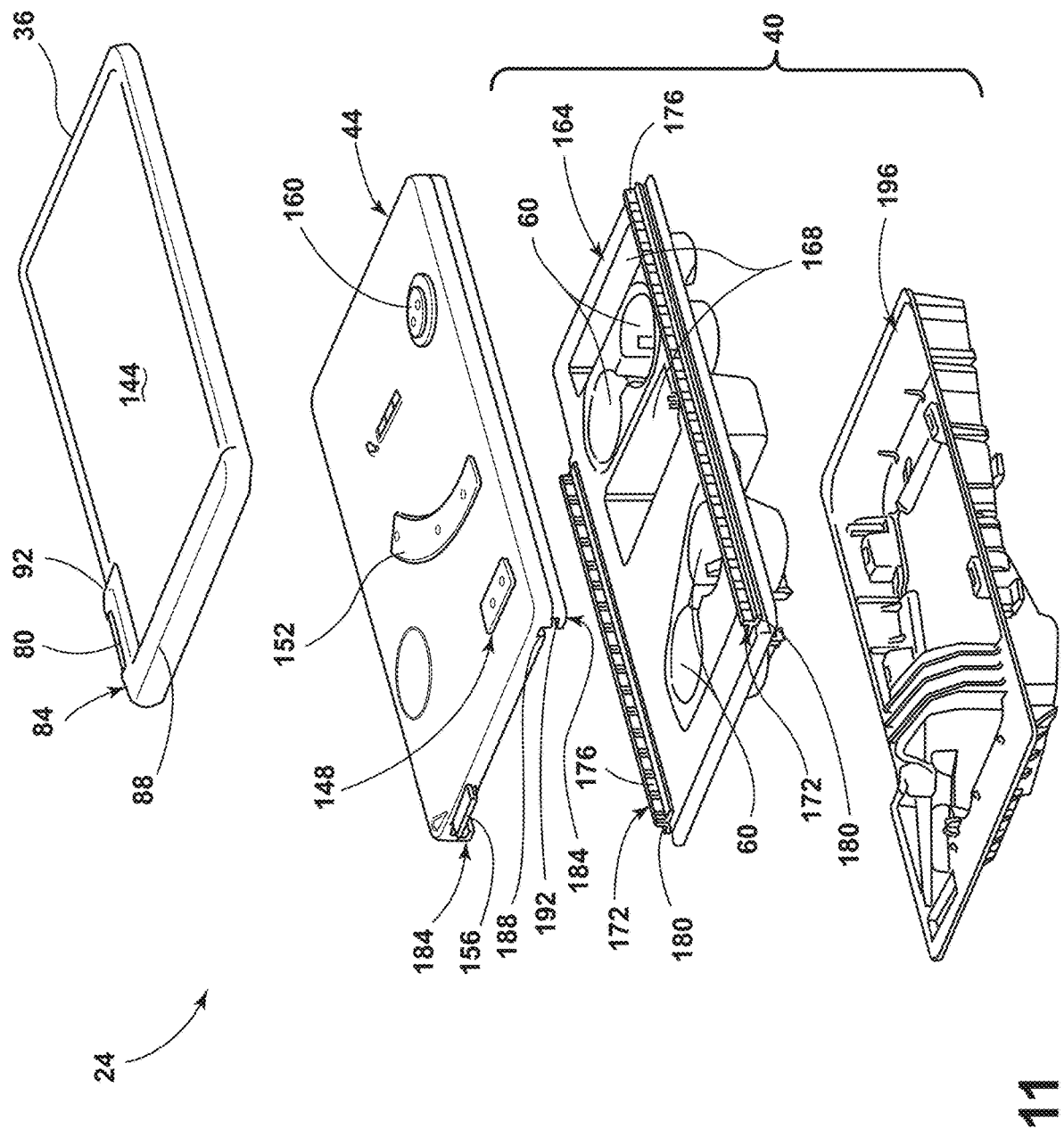
FIG. 11 is an exploded view of the convenience assembly, according to one example.
Figure 12:
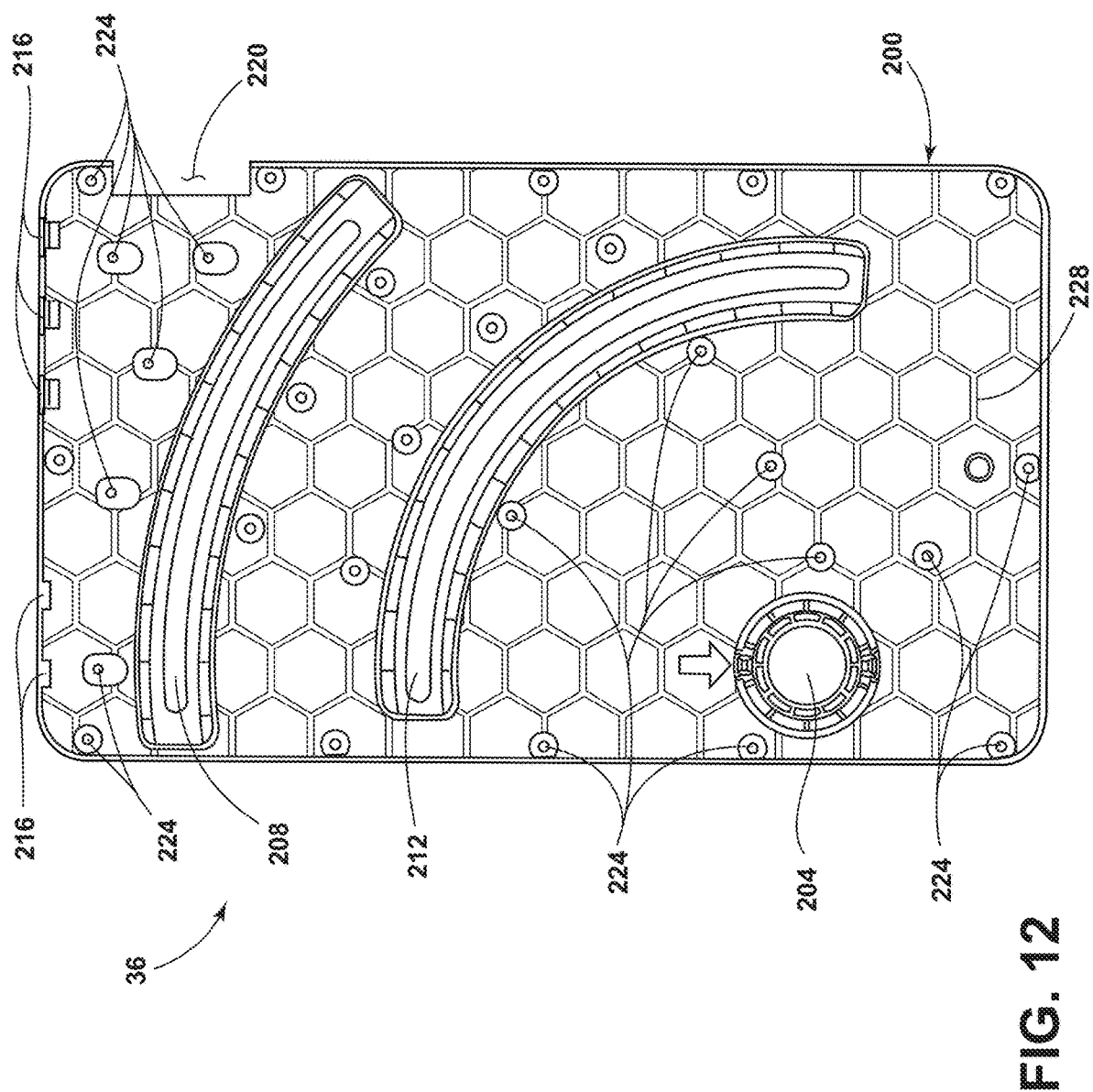
FIG. 12 is a top view of a bottom portion of the work surface, illustrating various features, according to one example.
Figure 13:
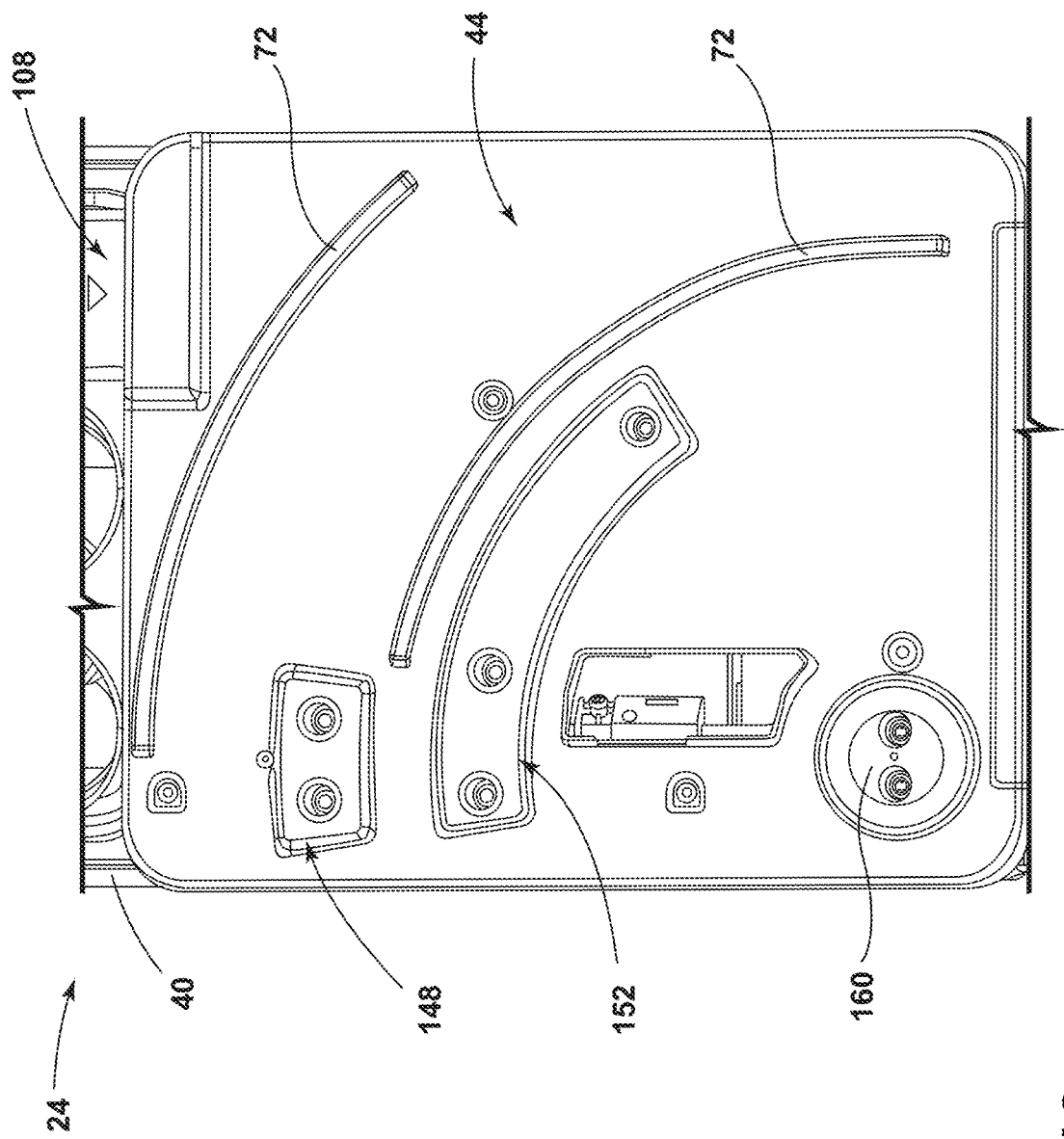
FIG. 13 is a top view of a mounting structure that engages an underside of the work surface, illustrating travel guides that aid in actuation of the work surface.
Figure 14:
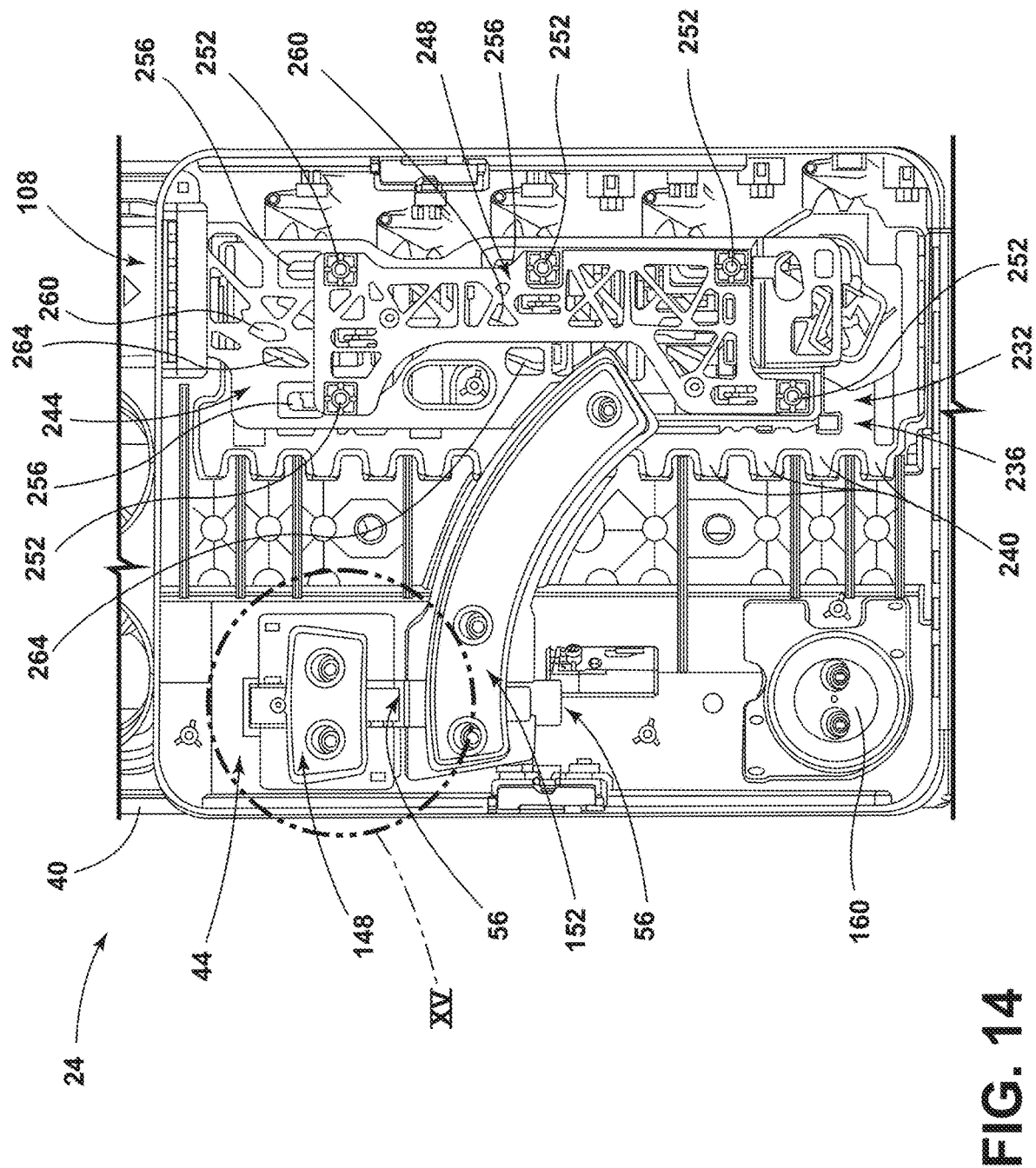
FIG. 14 is a top view of the mounting structure, illustrating internal components of a lock assembly that retains the work surface in various positions.
Figure 15:
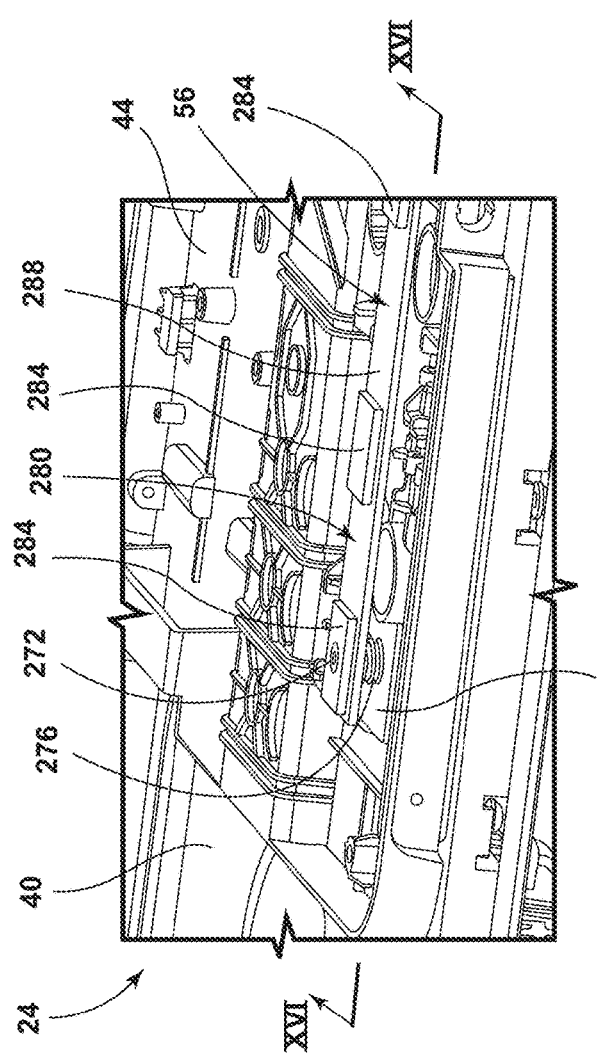
FIG. 15 is an expanded side elevation view, taken at region XV of FIG. 14, illustrating a switch-actuation assembly positioned within the convenience assembly.
Figure 16:
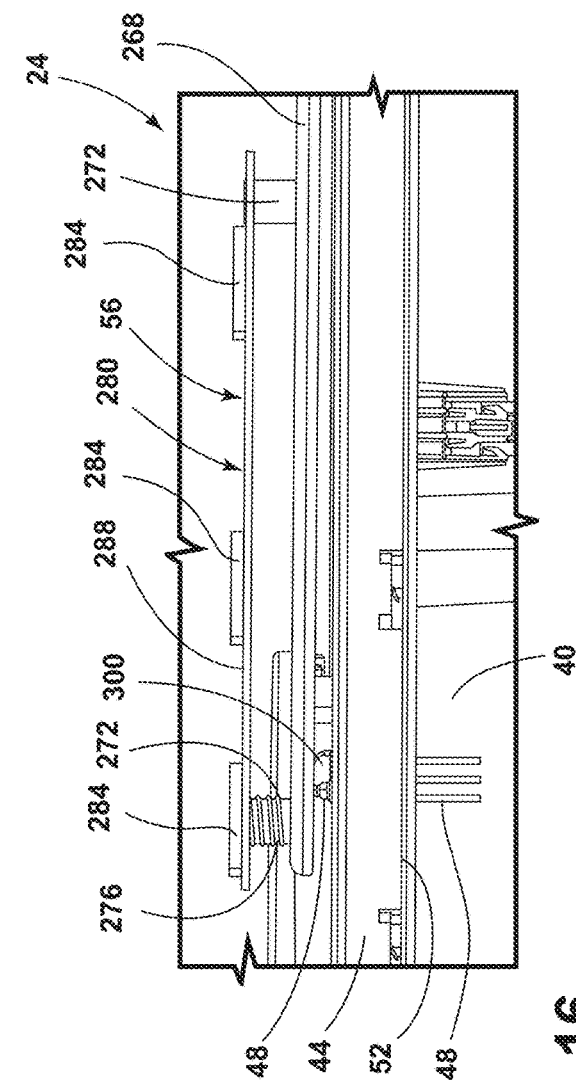
FIG. 16 is a cross-sectional view, taken along line XVI-XVI of FIG. 15, of the convenience assembly proximate the switch-actuation assembly.
Figure 17:
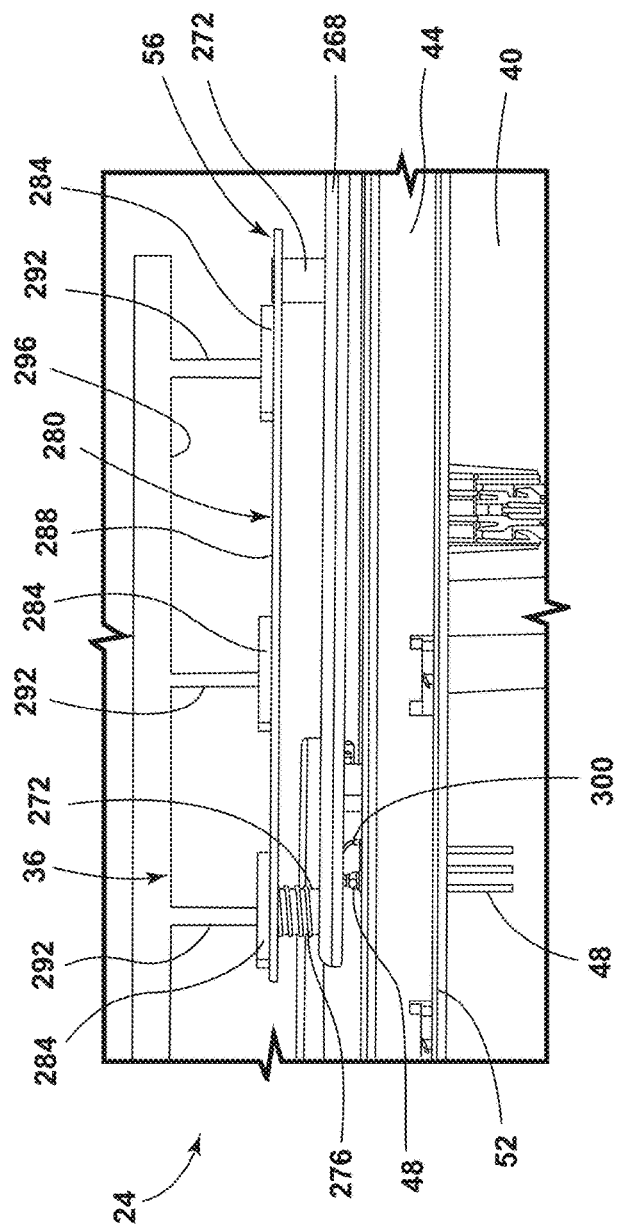
FIG. 17 is a cross-sectional view, taken along line XVI-XVI of FIG. 15, of the convenience assembly proximate the switch-actuation assembly, illustrating ribs that extend from the underside of the work surface.
Figure 18:
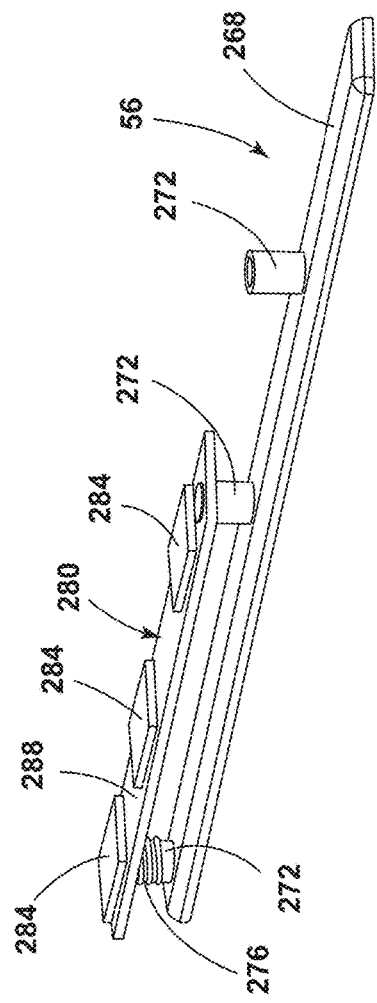
FIG. 18 is a side perspective view of the switch-actuation assembly, illustrating posts that extend from a planar portion to interact with an engagement portion.

In various examples, the work surface 36 may be placed in a rotationally stowed position, such as that depicted in at least FIGS. 3, 5, and 8. The work surface 36 may additionally be placed in a longitudinally stowed position relative to the support structure 40 (e.g., the seatback 28), such as that depicted in at least FIGS. 1, 2, and 8. The longitudinally stowed position of the work surface 36 may be defined as a position where the work surface 36 is directly supported by, or in line with, the support structure 40 throughout a cross-section of the work surface 36. Said another way, the longitudinally stowed position may be defined as a position where the work surface 36 and the support structure 40 are dimensionally co-localized along a plane that extends perpendicularly, or approximately, generally, or substantially perpendicularly, from a surface of the work surface 36. Said yet another way, the longitudinally stowed position may be defined as a position where the work surface 36 and the support structure 40 are dimensionally co-localized along a plane that is perpendicular to a plane that defines the rotational actuation of the work surface 36 and/or the longitudinal actuation of the mounting structure 44 relative to the support structure 40. The longitudinally stowed position of the work surface 36 and/or the mounting structure 44 may additionally be defined as when the work surface 36 and/or the mounting structure 44 are in a longitudinally rearwardmost position upon the support structure 40, such as that depicted in FIGS. 1, 2, and 8. When the work surface 36 and/or the mounting structure are in the rotationally stowed position and the longitudinally stowed position, the rotationally and longitudinally stowed position may be referred to as a home position.

The present disclosure provides a convenience assembly 24 that is feature-packed while maintaining a compact package size. A benefit of utilizing the switch 48 and the switch-actuation assembly 56 is that the switch 48 and the switch-actuation assembly 56 can be utilized in a pass-through manner with regard to their coupling with the other components of the convenience assembly 24. That is, mounting of the switch 48 and the switch-actuation assembly 56 is accomplished in a manner that allows mounting features (e.g., the posts 272) to be coupled through some of the components of the convenience assembly 24 (e.g., the mounting structure 44). Accordingly, added height to the convenience assembly 24 resulting from the switch 48 and/or the switch-actuation assembly 56 is minimized or entirely prevented. Additionally, such a coupling of the switch 48 and the switch-actuation assembly 56 prevents the switch 48 and the switch-actuation assembly 56 from interfering with the operation or utilization of the convenience assembly 24 (e.g., movement of the mounting structure 44 and/or the work surface 36). Further, such an arrangement of the switch 48 and the switch-actuation assembly 56 can enable wiring of the switch 48 in a manner that does not interfere with the operation of the mounting structure 44 and/or the work surface 36 as the wiring can be primarily housed within the support structure 40, which can remain stationary. For example, the switch 48 can be coupled to the support structure 40 with wiring extending through the support structure 40 and the switch-actuation assembly 56 can be coupled to the mounting structure 44 in a pass-through manner. The switch 48 can remain in a constant position within the support structure 40 as the mounting structure 44 and/or the work surface 36 are actuated. The planar portion 268 of the switch-actuation assembly 56 can have a length that corresponds to the range of motion of the mounting structure 44 such that regardless of a lateral position of the mounting structure 44 relative to the support structure 40, the rotational position of the work surface 36 can be determined by monitoring the state of the switch 48 (e.g., opened versus closed states). While the switch 48 is described as a physically-actuated switch, the present disclosure is not so limited. It is contemplated that alternative approaches may be utilized instead of a physically-actuated switch without departing from the concepts disclosed herein. In general, the switch 48 is utilized as an indicator of a rotational position of the work surface 36. Accordingly, the function of the switch 48 may be accomplished by, but is not limited to, a physically-actuated switch, a proximity sensor, a reed switch, a photoelectric sensor, an optical light beam sensor, and the like without departing from the concepts disclosed herein.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A convenience assembly, comprising:
   a support structure;
   a work surface coupled to the support structure by a mounting structure, the work surface comprising one or more ribs on an underside thereof;
   a switch protruding from the support structure toward an underside of the mounting structure; and
   a switch-actuation assembly positioned between the support structure and the work surface and movable between raised and lowered positions relative to the switch to indicate a rotational position of the work surface relative to the support structure, the switch-actuation assembly comprising:
   an engagement portion that comprises one or more protrusions, wherein the one or more protrusions extend from a body of the engagement portion, and wherein each of the one or more ribs on the work surface engages with one of the one or more protrusions when the work surface is in a stowed position.

2. The convenience assembly of claim 1, wherein the switch-actuation assembly comprises:
   a planar portion;
   one or more posts that extend from the planar portion;
   a biasing member on at least one of the one or more posts; and
   the engagement portion is positioned upon the one or more posts.

3. The convenience assembly of claim 2, wherein at least a portion of the switch-actuation assembly passes through the mounting structure.

4. The convenience assembly of claim 1, wherein at least one of the one or more protrusions corresponds with one of the one or more posts.

5. The convenience assembly of claim 1, wherein each of the one or more ribs disengages with the associated one of the one or more protrusions when the work surface is not in the stowed position.

6. The convenience assembly of claim 1, wherein the switch-actuation assembly is movable between the raised position and the lowered position by actuation through the mounting structure.

7. The convenience assembly of claim 1, wherein the mounting structure is movable along a horizontal plane relative to the support structure.

8. The convenience assembly of claim 7, wherein the work surface is capable of rotational motion relative to the mounting structure regardless of a lateral position of the mounting structure relative to the support structure.

9. The convenience assembly of claim 1, wherein the work surface is capable of rotational motion relative to the mounting structure.

10. The convenience assembly of claim 1, wherein the convenience assembly is installed in a vehicle.

11. The convenience assembly of claim 10, wherein the support structure is a vehicle seating assembly.

12. The convenience assembly of claim 10, wherein the support structure is a vehicle console.

13. A convenience assembly, comprising:
    a support structure;
    a work surface coupled to the support structure by a mounting structure, the work surface comprising one or more ribs on an underside thereof;
    a switch protruding from the support structure toward an underside of the mounting structure; and
    a switch-actuation assembly positioned between the support structure and the work surface and movable between raised and lowered positions relative to the switch to indicate a rotational position of the work surface relative to the support structure, the switch-actuation assembly being movable between the raised position and the lowered position by actuation through the mounting structure-, the switch-actuation assembly comprising:
    an engagement portion that comprises one or more protrusions, wherein the one or more protrusions extend from a body of the engagement portion, and wherein each of the one or more ribs on the work surface engages with one of the one or more protrusions when the work surface is in a stowed position.

14. The convenience assembly of claim 13, wherein the switch-actuation assembly comprises:
    a planar portion;
    one or more posts that extend from the planar portion;
    a biasing member on at least one of the one or more posts; and
    the engagement portion is positioned upon the one or more posts.

15. The convenience assembly of claim 14, wherein at least one of the one or more protrusions corresponds with one of the one or more posts.

16. The convenience assembly of claim 13, wherein each of the one or more ribs disengages with the associated one of the one or more protrusions when the work surface is not in the stowed position.

17. The convenience assembly of claim 13, wherein the mounting structure is movable along a horizontal plane relative to the support structure.

18. A convenience assembly, comprising:
- a support structure;
- a work surface coupled to the support structure by a mounting structure, the work surface comprising one or more ribs on an underside thereof;
- a switch protruding from the support structure toward an underside of the mounting structure; and
- a switch-actuation assembly positioned between the support structure and the work surface and movable between raised and lowered positions relative to the switch to indicate a rotational position of the work surface relative to the support structure, the switch-actuation assembly comprising a planar portion, one or more posts that extend from the planar portion, a biasing member on at least one of the one or more posts, and an engagement portion positioned upon the one or more posts, wherein the engagement portion comprises one or more protrusions that extend from a body of the engagement portion, and wherein each of the one or more ribs on the work surface engages with one of the one or more protrusions when the work surface is in a stowed position.

19. The convenience assembly of claim 18, wherein the mounting structure is movable along a horizontal plane relative to the support structure.

20. The convenience assembly of claim 19, wherein the work surface is capable of rotational motion relative to the mounting structure regardless of a lateral position of the mounting structure relative to the support structure.

* * * * *